(12) United States Patent
Antonin

(10) Patent No.: US 7,707,234 B2
(45) Date of Patent: Apr. 27, 2010

(54) USE OF MULTIPLE DATA COMPARATORS IN PARALLEL TO TRIGGER AN OSCILLOSCOPE ON A PATTERN FOUND IN A SERIAL DATA STREAM

(75) Inventor: Frederic Antonin, Ramsey, NJ (US)

(73) Assignee: LeCroy Corporation, Chestnut Ridge, NY (US)

(*) Notice: Subject to any disclaimer, the term of this patent is extended or adjusted under 35 U.S.C. 154(b) by 1238 days.

(21) Appl. No.: 11/244,616

(22) Filed: Oct. 6, 2005

(65) Prior Publication Data

US 2006/0077079 A1    Apr. 13, 2006

Related U.S. Application Data

(60) Provisional application No. 60/616,883, filed on Oct. 7, 2004.

(51) Int. Cl.
*G06F 7/04* (2006.01)
(52) U.S. Cl. ....................................... 708/212
(58) Field of Classification Search ........................ None
See application file for complete search history.

(56) References Cited

U.S. PATENT DOCUMENTS

| 4,032,885 | A | 6/1977 | Roth |
| 4,414,677 | A | 11/1983 | Ive et al. |
| 4,498,141 | A | 2/1985 | Cooper |
| 4,802,192 | A | 1/1989 | Eto et al. |
| 4,847,877 | A | 7/1989 | Besseyre |
| 5,140,618 | A | 8/1992 | Kinoshita et al. |
| 5,383,142 | A | 1/1995 | Chung |
| 5,502,748 | A | 3/1996 | Wilkinson |
| 6,658,363 | B2 | 12/2003 | Mejia et al. |
| 6,738,794 | B2 | 5/2004 | Stein et al. |
| 2002/0150127 | A1 | 10/2002 | Heinen et al. |

*Primary Examiner*—David H Malzahn
(74) *Attorney, Agent, or Firm*—Gordon Kessler

(57) ABSTRACT

A method and system are provided for determining a location of a predetermined N bit sequence in a data stream. The method comprises the steps of determining two N bit data words from consecutive bits of the data stream, and providing N, N bit comparators. A first N bits of the two N bit data words is compared with the predetermined N bit data sequence by a first of the N comparators, and a next N bits, starting at a second bit, of the two N bit data words are compared with the predetermined N bit sequence by a second of the N bit comparators. These comparisons are repeated, incrementing the starting bit, until N comparators have been employed and the first through N bits have been employed as the starting bit.

12 Claims, 2 Drawing Sheets

USE OF MULTIPLE DATA COMPARATORS IN PARALLEL TO TRIGGER AN OSCILLOSCOPE ON A PATTERN FOUND IN A SERIAL DATA STREAM

CROSS REFERENCE TO RELATED APPLICATIONS

This Application claims the benefit of U.S. Provisional Patent Application 60/616,883 filed Oct. 7, 2004, there entire contents thereof being incorporated herein by reference.

BACKGROUND OF THE INVENTION

Searching for a particular sequence of data in a continuous serial bit stream is a process that has traditionally taken a long period of time, and has more recently been very software and computer processor intensive. FIG. 1 depicts a classical implementation of the search for a requested eight bit data pattern contained within a data stream. As is shown in FIG. 1, a data stream 100 comprises a number of data bits D−n ... D0, D1 ... D+n, In FIG. 1, bits D0-D7 are currently located in a shift register 120. Bits D8 and higher of data stream 100 have already been output from shift register 120. Bits D−1 and lower of bit stream 100 have not yet been entered in shift register 120. The eight bit data pattern that is to be searched for is stored into a second register 130, and includes bits C0-C7. While eight bits are shown, any number of bits could be employed.

To determine whether the desired bit pattern ins present in the data stream, the portion of the bit stream in shift register 120 is compared to the eight bit data pattern stored in register 130 on a bit by bit basis through the use of an eight bit comparator 140. If all bits are the same, the comparator determines that the data currently in the shift register is the requested data pattern. If the bits are not all the same, then at each bit rate period one new bit is shifted into the shift register pushing all the other bits to the right by one position. Thus, after a first comparison has failed, bit D7 id output from the shift register, bits D6-D0 are shifted one bit to the right, and bit D−1 is loaded into the shift register. After the shifting procedure is completed, once again the comparator compares the new data in the shift register to the requested data pattern.

An attempt to improve on this design has been set forth in U.S. Pat. No. 4,802,192 issued to Eto. et al. In this patent, a system is described that divides a 16-bit sequence into four portions, and then each comparator performs a search for a portion (1/n) bits of the overall pattern. A major drawback of this method is that even though the comparators are each running at a 1/n frequency, the outputs from the various comparators and the internal timing and clocks of the comparators must be very tightly controlled in order to recombine the low speed output data from the n comparators to generate one high speed result. Additionally, even in such a solution, it is necessary to perform four comparisons with each four bit comparator, or 16 comparisons, to determine the proper sequence. While this system does allow some parallel processing, it does not reduce the overall number of comparisons, and in fact, while reducing complexity in one respect, increases the required complexity of the overall timing and control system.

These prior art approaches suffer at least one major problem when applied to data running at a high speed, such as a multi gigabit serial transmission. The comparator (or set of comparators) is required to operate at the bitrate frequency and may require a custom design using extremely high-speed technology.

SUMMARY OF THE INVENTION

In accordance with the invention, a method and apparatus is provided that avoids the need to build such a high speed data comparator. The input data stream is first deserialized into an N bit wide bus. Then, N comparators are used to compare a desired bit sequence to the input data stream in parallel. Thus, referring to the above example, but where one were only looking for a four bit sequence, at first the same eight bits D0-D7 are contained in the shift register. However, rather than having only one four-bit register for holding the desired bit sequence, four such registers, for example, may be provided. These registers are provided offset from each other so that the bit sequence in the first register is compared with bits D7-D4, the bit sequence in the second register is compared to bits D6-D3, the bit sequence in the third register is compared to bits D5-D2, and the bit sequence in the fourth register is compared to bits D4-D1. These four comparisons are all performed in parallel, and thus, four comparisons are performed during a single clock cycle. If a match is not determined, a full word (four bits D4-D7 in the above example) are removed at once, bits D3-D0 are shifted over, and bits D−1-D−4 are shifted into the register, and an additional comparison takes place. Testing for an eight bit sequence would either require consecutive application of the four bit comparison, or could be performed by an eight bit comparison. However, depending upon the number of comparators, a longer shift register may be required. Upon determination of a match, further processing is performed to confirm which data in which register matched the data from the bit stream.

In this manner, each set of bits in the bit stream is compared to the desired bit stream, yet each of the comparators is able to operate at a reduced rate, specifically the bit rate divided by the number of comparators.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combinations of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

In accordance with the invention, an architecture that overcomes the problems of the prior art is proposed. This architecture will now be described, making reference to the figures.

Figure 1:
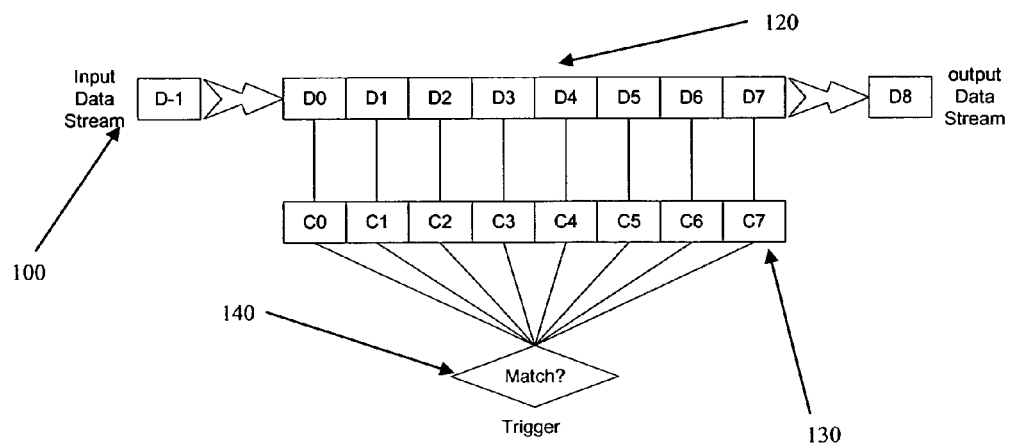
FIG. 1 is a schematic representation of a prior art comparator system employing a single eight-bit comparator.
Figure 2:
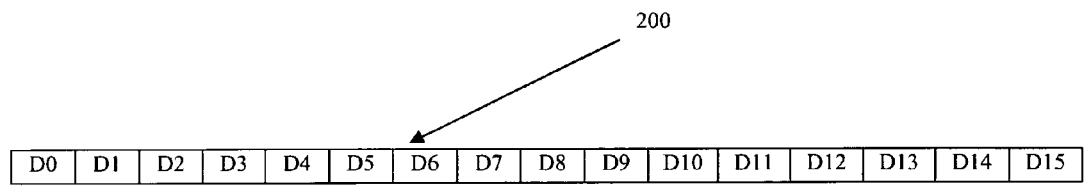
FIG. 2 is a schematic representation of a serial data stream.
Figure 3:
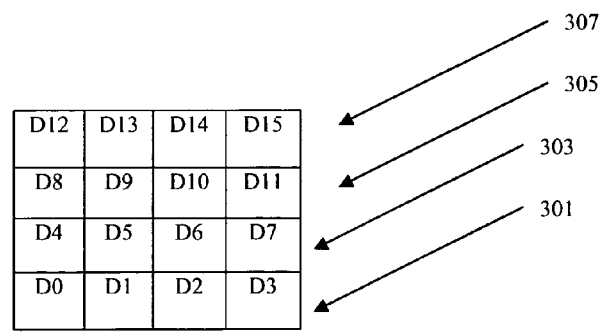
FIG. 3 is a schematic representation of the serial data stream of FIG. 2 converted to an N bit parallel format.

As is shown in FIG. 2, a serial data stream 200 is shown comprising 4*N bits of data. In this exemplary embodiment of the invention, N=4, so 4*N, and the length of the serial data stream, is 16 bits. Of course any other desired serial data stream length may be employed, this length having no bearing on the functioning of the method. Indeed, as will be described below, each iteration of the invention requires approximately 2*N bits of data. One important element of the invention is that each comparator has a length N, which is the same length as the length of the bit pattern being searched for. A different pattern length would use correspondingly different length comparators, after appropriately adjusting related values in the system. First, a divider converter is provided for converting the serial data stream into a series of N bit parallel data stream. The results of such a conversion are shown in FIG. 3, the N, N bit parallel data streams being shown at 301, 303, 305 and 307. N parallel data streams are shown as they allow for easy description of the functioning of the system. As noted above 2*N parallel data streams are utilized at each iteration of the invention. Of course, as will be described below, once a first N bit word is ruled out as not including the desired pattern, and only N−1 N bit words remain, a new N bit word is generated from the next N bits in the incoming serial data stream.

Figure 4:
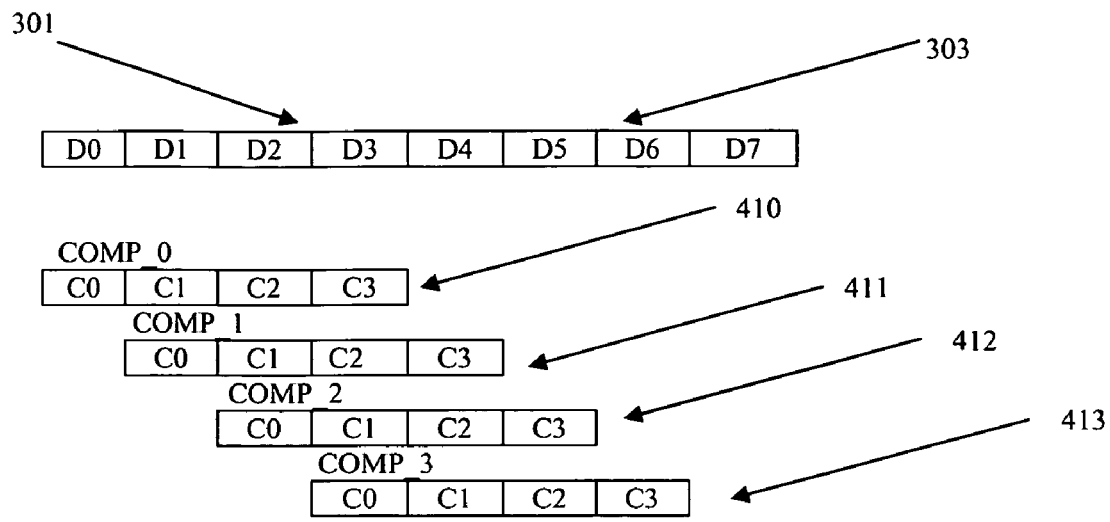
FIG. 4 is a schematic representation of a first two of the N bit words of FIG. 3 being places in a 2*N bit format and four N bit comparators searching for a pattern in the 2*N bits of data.

Referring next to FIG. 4, a first and second of the N bit parallel data streams 301, 303 are placed together to form a 2*N bit data sequence. The system further comprises N comparators 410, 411, 412, 413, each shifted by one bit position relative to the 2*N data words 301, 303. The N comparators all work in parallel, therefore substantially concurrently and simultaneously during the same clock timings. The first comparator 410 compares bits D0 to D(N−1) of the serial data stream to the requested data pattern. At the same time the second comparator 411 compares bits D1 to DN of the serial data stream to the same requested data pattern and so on until the last comparator compares bits D(N−1) to D(2*N−1) to the requested data pattern. In this manner, all data sequences that begin with a bit in the first N bits of the data sequence are considered in parallel at the same time during one pass of the data sequence. As a result of the parallel operation of these comparators, each of the comparators operates in parallel at 1/N of the birate frequency.

Figure 5:
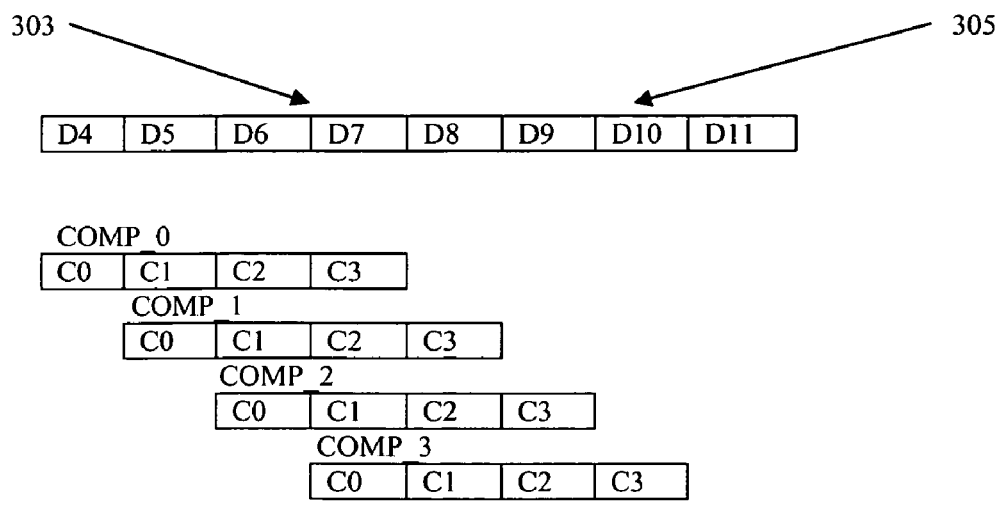
FIG. 5 is a schematic representation of a second two of the N bit words of FIG. 3 being places in a 2*N bit format and four N bit comparators searching for a pattern in the 2*N bits of data.

While the first comparison cycle required that the first 2 N bit data sequences 301, 303 be present for comparison, during each subsequent cycle, the first N bit data word is replaced by the second N bit data word and a next new N bit data word is provided (on the right side of the figures) for comparison. Therefore, as is shown in FIG. 5, for a second comparison step, N bit data sequences 303, 305 are employed, the comparison of the data bits with each of the N comparators being performed similarly to that noted above.

Once a requested data pattern is found by one of the comparators, it is necessary to determine precisely which of the comparators has actually found the requested data pattern. In the above described example, because there are four comparators, upon determination of a match at any of the four comparators, it is noted that a match was found during a particular trigger. This trigger, however, has an N bit uncertainty because each comparator is running at 1/N of the bitrate frequency. Thus, the apparatus is only aware that there was a match during a particular trigger, and not necessarily precisely where in the bitstream the match occurred.

However, in accordance with the invention, if one knows the bitrate frequency (F) and knows which of the N comparators has found the pattern, one can precisely locate the requested data pattern in the data stream based upon its offset from the trigger. Once determined, this seeming uncertainty can be compensated for. Thus, if T is the bit period, COMP_0 (e.g. 410) will carry a 0*T delay compensation COMP_1 (e.g. 411) a 1*T delay compensation and COMP_N−1 a (N−1)*T delay compensation. By determining which comparator reported the match, and by applying an appropriate corresponding delay to the trigger signal, one can determine the precise timing in the bitstream for the matching pattern.

The advantage of this method of the invention is that the operating frequency of the comparators can be decreased by a factor of N allowing the implementation of the comparators to employ off the shelf technology, such as an FPGA, rather than requiring custom, higher frequency components. Thus, rather than running at the bit rate, the comparators can run at a speed equal to the bitrate divided by the number of comparators.

What is claimed:

1. A method for determining a location of a predetermined N bit sequence in a data stream, comprising the steps of:
   (a) determining two N bit data words from consecutive bits of the data stream;
   (b) providing N, N bit comparators;
   (c) comparing a first N bits of the two N bit data words with the predetermined N bit data sequence by a first of the N comparators;
   (d) comparing a next N bits, starting at a second bit, of the two N bit data words with the predetermined N bit sequence by a second of the N bit comparators: and
   (e) repeating step (d), incrementing the starting bit, until N comparators have been employed and the first through N bits have been employed as the starting bit;
   (f) discarding first N bit data word when all N sequences N data bits as compared by one of the N comparators do not match the predetermined N bit sequence;
   (g) shifting the second N bit data word to become the first N bit data word;
   (h) determining a next N bit data word from next consecutive bits of the data stream to become the second N bit data word; and
   (i) performing steps (c)-(e) on the two current N bit data words.

2. The method of claim 1, further comprising the steps of:
   determining that a sequence of N data bits as compared by one of the N comparators matches the predetermined N bit sequence;
   determining which of the N comparators contained the N data bits that matched the predetermined N bit sequence; and
   based upon a predetermined bit delay associated with each of the N comparators, determining a precise timing within the data stream containing the N data bits that matches the predetermined bit sequence.

3. The method of claim 1, wherein each comparator operates at a frequency of 1/N.

4. The method of claim 1, wherein the N comparators are employed substantially in parallel.

5. A computer program, adapted to operate in accordance with a data acquisition system and stored on a computer readable medium associated therewith, for determining a location of a predetermined N bit sequence in a data stream, comprising instructions for performing the steps of:
- (a) determining two N bit data words from consecutive bits of the data stream;
- (b) providing N, N bit comparators;
- (c) comparing a first N bits of the two N bit data words with the predetermined N bit data sequence by a first of the N comparators;
- (d) comparing a next N bits, starting at a second bit, of the two N bit data words with the predetermined N bit sequence by a second of the N bit comparators: and
- (e) repeating step (d), incrementing the starting bit, until N comparators have been employed and the first through N bits have been employed as the starting bit;
- (f) discarding first N bit data word when all N sequences N data bits as compared by one of the N comparators do not match the predetermined N bit sequence;
- (g) shifting the second N bit data word to become the first N bit data word;
- (h) determining a next N bit data word from next consecutive bits of the data stream to become the second N bit data word; and
- (i) performing steps (c)-(e) on the two current N bit data words.

6. The computer program of claim 5, further comprising instructions for performing the steps of:
- determining that a sequence of N data bits as compared by one of the N comparators matches the predetermined N bit sequence;
- determining which of the N comparators contained the N data bits that matched the predetermined N bit sequence; and
- based upon a predetermined bit delay associated with each of the N comparators, determining a precise timing within the data stream containing the N data bits that matches the predetermined bit sequence.

7. The computer program of claim 5, wherein each comparator operates at a frequency of 1/N.

8. The computer program of claim 5, wherein the N comparators are employed substantially in parallel.

9. A system for determining a location of a predetermined N bit sequence in a data stream, comprising:
- a selector for determining two N bit data words from consecutive bits of the data stream;
- N, N bit comparators for comparing, by the first N bit comparator, a first N bits of the two N bit data words with the predetermined N bit data sequence by a first of the N comparators, and by a second N bit comparator, comparing a next N bits, starting at a second bit, of the two N bit data words with the predetermined N bit sequence by a second of the N bit comparators;
- wherein such comparison is performed by each of the N bit comparators, incrementing the starting bit, until all N comparators have been employed and the first through N bits have been employed as the starting bit; and
- wherein when it is determined that all N sequences of N data bits as compared by one of the N comparators do not match the predetermined N bit sequence, the first N bit data word is discarded, the second N bit data word is shifted to become the first N bit data word, the selector determines a next N bit data word from next consecutive bits of the data stream to become the second N bit word, and the N, N bit comparators perform new comparisons.

10. The system of claim 9, wherein each of the N, N bit comparators determines whether a sequence of N data bits matches the predetermined N bit sequence, and wherein, based upon a predetermined bit delay associated with each of the N comparators, determining a precise timing within the data stream containing the N data bits that matches the predetermined bit sequence.

11. The system of claim 9, wherein each comparator operates at a frequency of 1/N.

12. The system of claim 9, wherein the N comparators are employed substantially in parallel.

* * * * *